June 20, 1944. W. RIEDEL 2,352,008
MOTION PICTURE CAMERA
Filed June 19, 1941
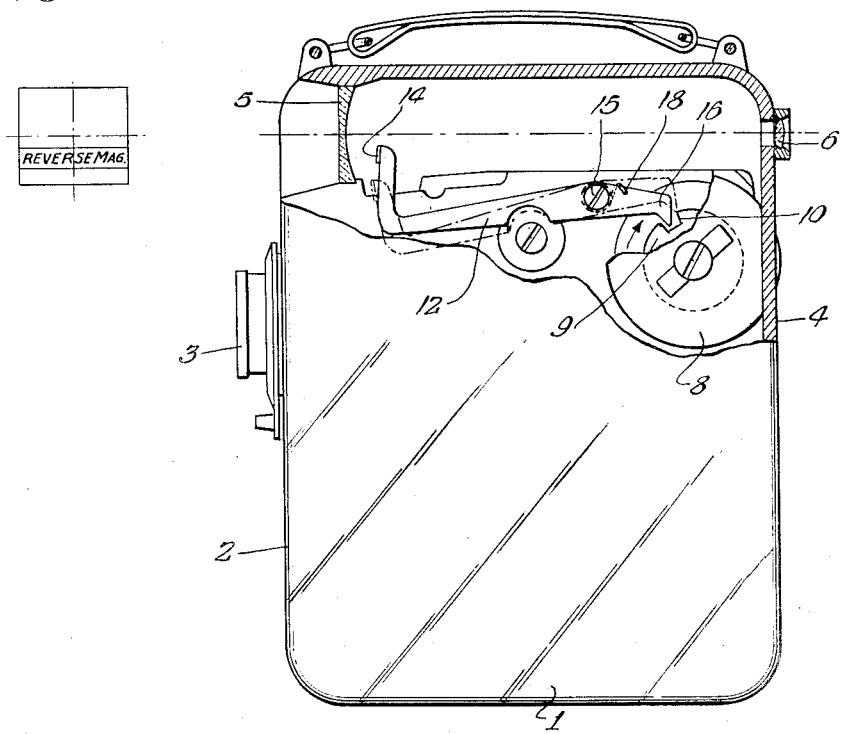
Inventor
Walter Riedel
BY
Singer, Ehlert, Stern & Carlberg
Attys.

Patented June 20, 1944

2,352,008

UNITED STATES PATENT OFFICE 2,352,008

MOTION-PICTURE CAMERA

Walter Riedel, Dresden, Germany; vested in the Alien Property Custodian

Application June 19, 1941, Serial No. 398,769
In Germany March 5, 1940

1 Claim. (Cl. 88—16)

The invention relates to improvements in motion picture cameras and particularly relates to cameras of the magazine-type which are loaded with a reversible film magazine.

In motion picture cameras employing reversible film magazines the driving mechanism, customarily a spring motor, is automatically stopped when the film has completed its first run through the cameras, whereupon the magazine has to be reversed for the second run through the camera. During the first run of the film through the camera only one half of each picture frame is exposed, while the other half is exposed during the second run through the camera. Before the film is projected it is slit longitudinally in two halves, and the halves are spliced together end to end to produce a film which is half as wide as the original film, but twice as long. In the present day motion picture cameras the automatic stopping of the spring motor at the end of the first run of the film through the camera takes place without warning. This is a disadvantage in that the filming of the last scene may be interrupted suddenly at a most undesirable moment, thus rendering this scene incomplete and often entirely useless.

It is an object of the invention to overcome this disadvantage by providing the motion picture camera with an optical signaling device which is set in operation a predetermined time before the film has run off. The operator is thus informed of the approaching end of the film and is able to bring the scene being filmed to a proper finish in about the time interval which elapses before the end of the film passes through the film gate.

Another object of the invention is to provide the motion picture camera with a signal element which is automatically moved into the viewing field of the finder a predetermined time before the end of the film is exposed.

Still another object of the invention is to operatively connect the indicator element with the customary film footage counter in such a manner that the counter moves the indicator element into the viewing field of the finder after a predetermined length of the film has been exposed, thus advising the operator that he should bring the scene being filmed to a close during the remaining length of the film and that it then will be necessary to reverse the magazine, when the film has completed its first run through the camera, or that the magazine has to be replaced by a new one, when the film has completed its second run through the camera and thus is completely exposed.

Other objects of the invention will be apparent or will be specifically pointed out in the description forming a part of this specification, but the invention is not limited to the embodiment of the invention herein described, as various forms may be adopted within the scope of the claims.

In the drawing:

Fig. 1 is an elevation view of a motion picture camera, with its top portion in section to disclose the essential parts of the present invention, and Fig. 2 discloses the viewing field of the finder with the signaling device in operative position.

Referring to the drawing, the casing of the magazine-type motion picture camera is designated with 1 and the camera objective on the front wall 2 of the casing with 3. The upper portion of the camera casing 1 contains the view finder comprising the finder lens 5 near the front wall 2 and an ocular lens 6 attached to the rear wall 4.

The film footage counter is generally designated with 8 and in the present case is provided with a control cam 9 having a recess 10 in its circumference. A lever 12 provided at one end with a signal plate 14 is pivotally mounted between its ends in the camera casing at 15. The other end 16 of the lever 12 is held in engagement with the circumference of the cam 9 by a spring 18.

When the film footage counter 8 is actuated during the operation of the camera, i. e. when the motion picture film is moved through the film gate in rear of the camera objective, the control cam 9 is rotated by the counter. The recess 10 in the cam 9 is positioned at such a point relatively to the counter that the rear end 16 of the lever 12 enters the recess 10 after a predetermined length of the film has been exposed, leaving a sufficient length of the film unexposed as is required to bring the current scene to a proper finish. When the rear end 16 of the lever 12 enters the recess 10 the front end of the lever 12 swings upwardly and thereby moves the signal plate 14, which in the present instance bears the inscription "Reverse magazine," into the viewing area of the finder, as shown in the drawing. The inoperative position of the signal lever 12 is indicated in dotted lines in Fig. 1. The operation of the signaling device, in the present instance, the appearance of the signal plate 14, or any other suitable signal, in the viewing field of the finder informs the operator of the camera that the end of the film is about to run through the film gate and cautions him to bring the current scene to a close. When the operation of the camera is continued, after the appearance of the signal 14 in the finder, the cam 9, of course, continues its rotation and forces the rear end 16 of the lever 12 out of the recess 10, so that the signal plate 14 disappears from the finder viewing field. Now, the camera has to be stopped, if it has not been done already, which is done by releasing the customary push button, not shown, which controls the operation of the spring motor. The film magazine can now be reversed in the camera casing and thereby the film is brought into a position for a second run through the camera during which the other half of the picture frames on the film are exposed. The operation of the signal 14, of course, is repeated, when the film has run-off the aforesaid predetermined length and the operator is thus able to bring the last scene on the film to a proper close.

While in the disclosed embodiment of the invention the signal plate 14 is of opaque material and of a size to partly cover the viewing area of the finder, the invention is not limited to this type of construction. The signal plate 14 may be made also of transparent material, in which case it is preferably tinted with a suitable color to make its appearance distinct. Such a colored transparent plate 14 may be made as large as the finder viewing field to cover the same completely when the signal is moved into operative position.

What I claim is:

In a motion picture camera having a film magazine, a camera casing, a view finder positioned in said camera casing, and a rotatable film footage indicator in the casing, the combination of a signal device comprising a lever pivotally supported between its ends in said camera casing, a cam provided with an abrupt recess coaxially attached to said rotatable film footage indicator so as to rotate with the same, said cam being slidably engaged by one end of said lever for actuating the latter when said end drops into said recess once during a run of the film through the camera after almost the entire film has run off, whereby the other end of said lever is moved into the viewing field of said finder, and a signal plate on said last named end of said lever, said signal plate being normally invisible but becoming visible in the finder when the first named end of said lever drops into the recess of said cam, said cam thereupon removing said lever from said viewing field during the remaining length of the film.

WALTER RIEDEL.